UNITED STATES PATENT OFFICE.

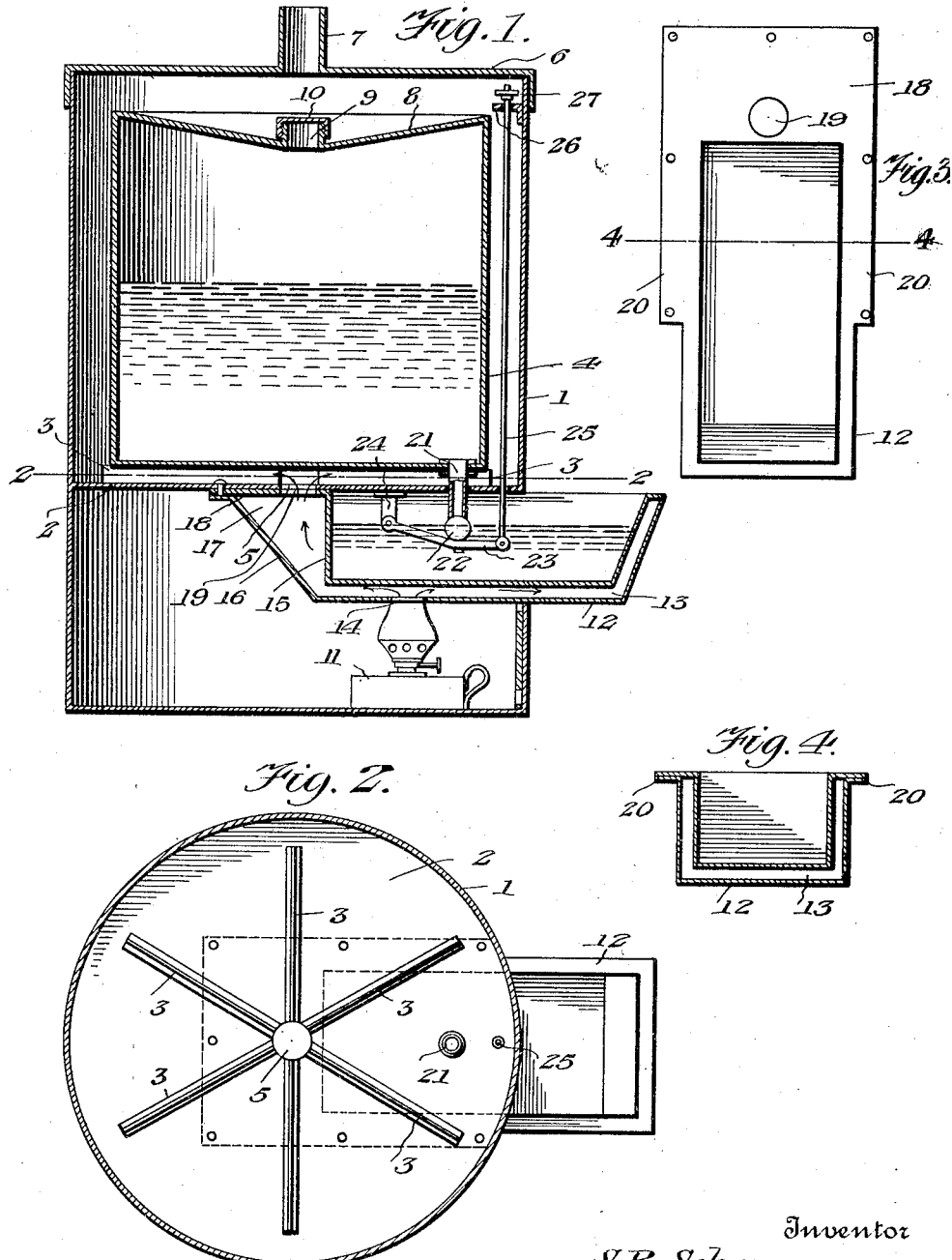

SAMUEL B. SCHEPPMANN, OF ST. PAUL, MINNESOTA.

WATERING-TANK AND HEATER.

1,330,723.   Specification of Letters Patent.   Patented Feb. 10, 1920.

Application filed June 7, 1919. Serial No. 302,446.

*To all whom it may concern:*

Be it known that I, SAMUEL B. SCHEPPMANN, a citizen of the United States, residing at St. Paul, in the county of Ramsey and State of Minnesota, have invented new and useful Improvements in Watering-Tanks and Heaters, of which the following is a specification.

The invention relates to a stock watering tank whereby a trough is automatically supplied with water from a tank and the principal object of the invention is to provide means for heating the water in both the trough and the tank to hold the same at a temperature above freezing.

Another object of the invention is to provide means for directing the heating vapors around both the trough and the tank.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a longitudinal section of a tank constructed in accordance with my invention;

Fig. 2 is a cross section on line 2—2 of Fig. 1;

Fig. 3 is a top view of the trough;

Fig. 4 is a section on line 4—4 of Fig. 3.

As shown in these views 1 indicates the casing, preferably of cylindrical shape and having a horizontally-arranged partition 2 therein for dividing the casing into a lower lamp chamber and an upper tank chamber. The upper face of the partition is provided with the radial ribs 3 on which the water tank 4 is adapted to rest so that a space is left between the upper face of the partition and the bottom of said tank. This partition is provided with a centrally-located opening 5. The tank 4 is of smaller dimensions than the casing so as to leave a space between the walls of the tank and casing and also between the top of the casing and the top of the tank. The casing is provided with a removable top 6 having a chimney 7 therein and the tank is provided with a closed top 8 provided with a filling opening 9 which is adapted to be closed by a screw plug 10. As will be seen, the opening 9 and the chimney are centrally arranged. Within the lamp chamber is located the lamp 11 and access to this lamp may be had through a door formed in the casing. Immediately above the lamp and secured to the partition 2 is the trough 12. This trough is of oblong shape and has a portion projecting through an opening in the wall of the casing so that the stock may drink from said projecting portion. The walls and bottom of said trough are double so as to form a space 13 through which the hot gases from the lamp circulate. The outer bottom of the trough is provided with an opening 14 which is located immediately over the upper end of the lamp chimney so that the gases from said lamp will flow into the space formed by the double bottom. The outer end of the trough flares outwardly, as shown, and the inner end has one wall straight as at 15 while its other wall is flaring as at 16 so as form a chamber 17. The spaces between the double walls of the tank open into this chamber and the top of this chamber is closed by the flange extension 18. This top has an opening 19 therein which registers with the opening 5 in the partition. The inner half of the trough is provided with the side flanges 20 at its upper edges which form extensions of the top and these flanges and the top are bolted to the partition, as shown.

It will thus be seen that the gases from the lamp will circulate around the trough and will then pass through the partition and come in contact with the bottom of the tank and then flow up the sides of the tank, over the top thereof and out through the chimney 7 so that the water in both the trough and the tank is heated.

The means for automatically controlling the flow of water from the tank to the trough consists of a tube 21 leading from the bottom of the tank through the partition and projecting into the trough. The lower end of this tube is adapted to be closed by a ball valve 22 carried by a lever 23 which has one arm pivoted to a depending lug 24. The valve 22 is a float valve so that the water in the trough will cause the same to rise until the lower end of the tube is closed and thus the water from the tank shut off. When the stock drink from the trough and lower the water, the valve will drop by the action of gravity and thus permit the water to pass through the tank into the trough. The free end of the lever 23 has attached thereto a rod 25 which extends upwardly into the space between the tank and casing and passes through a hole in a bracket 26 secured to the inner wall of the casing. The upper end of this rod is screw-threaded to receive a turn nut 27 whereby the rod may be moved longitudinally to cause the valve to close the tube when it is desired to prevent the water in the tank from passing to the trough.

It will be seen that the tank may be easily removed by lifting the cover case and lifting the tank from the casing. This will permit the bolts holding the trough to be tightened or removed when it is desired to remove the trough.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a casing having a horizontal partition therein provided with radial ribs on its upper face and with a central opening, a double wall tank connected with the lower face of the partition and having one end projecting through the casing, a chamber having an opening therein registering with the opening in the partition and said chamber communicating with the space between the walls of the trough, a tank having its bottom resting on the ribs, a lamp in the lower part of the casing and having its chimney in communication with the space between the walls of the trough and means for feeding the water from the tank to the trough.

2. A device of the class described comprising a casing, a horizontal partition therein dividing the same into an upper and lower chamber, said partition having radial ribs on its upper face and a central opening, a tank in the upper chamber having its bottom engaging said ribs, a double wall tank having its upper edge secured to the partition and one end projecting through the casing with the space between the walls of the trough communicating with the opening in the partition, the lower bottom of the trough having an opening therein, a lamp in the lower chamber having its chimney engaging said opening, a tube passing through the partition and the bottom of the tank and projecting into the trough, a float valve for closing the said tube and means for locking said valve in closed position.

In testimony whereof I affix my signature.

SAMUEL B. SCHEPPMANN.